May 6, 1952  J. C. LUNSFORD  2,595,866
DOUGHNUT MACHINE
Filed Feb. 25, 1946  5 Sheets-Sheet 3
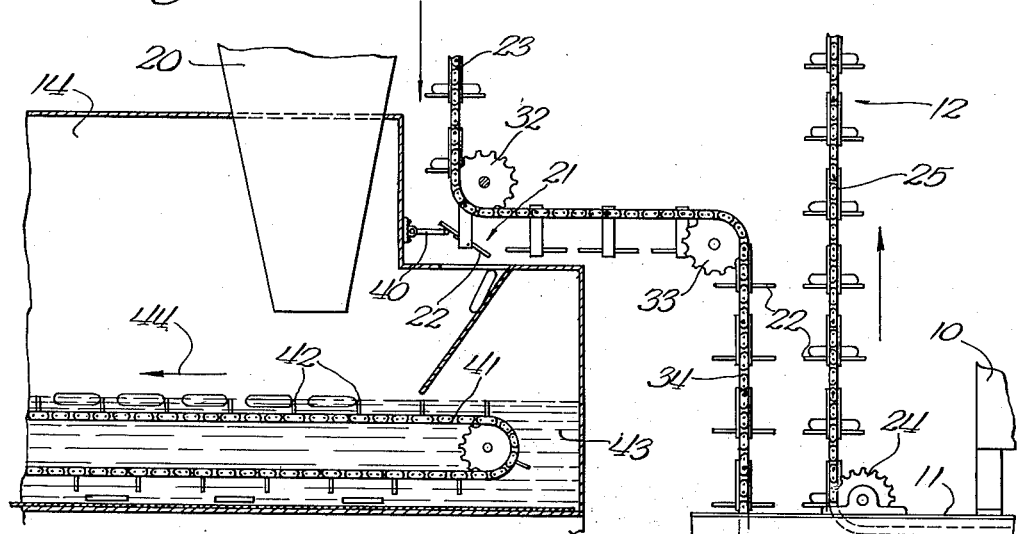
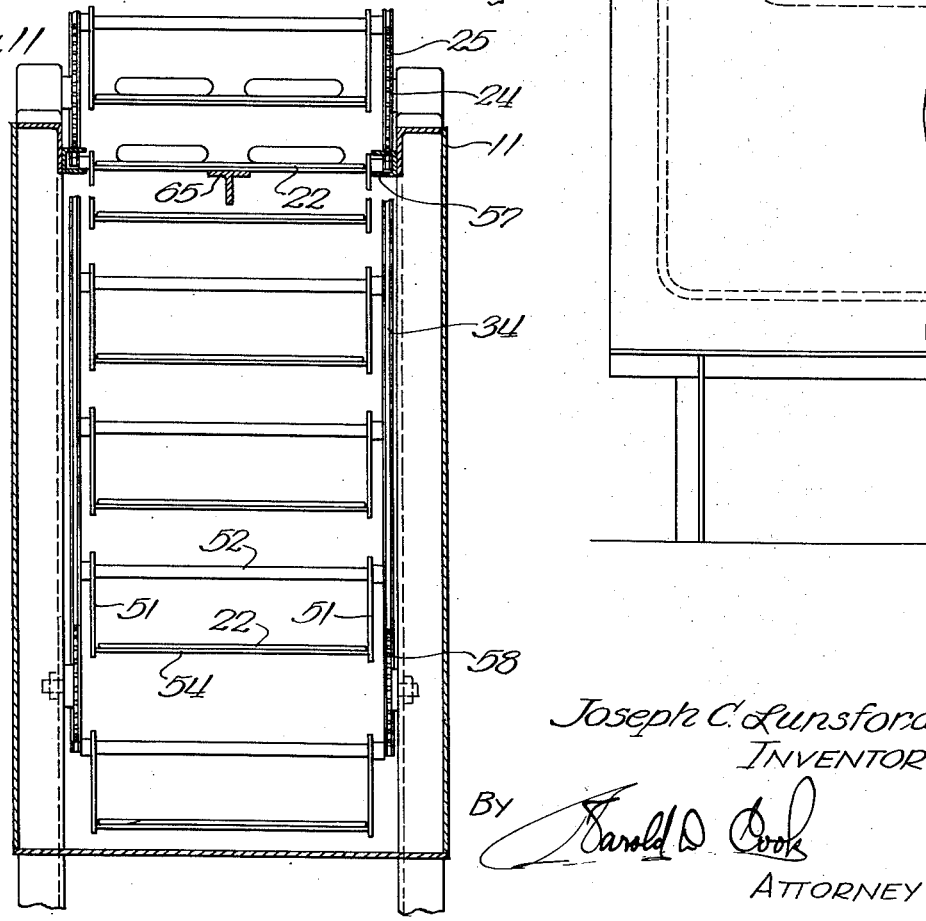
Joseph C. Lunsford
INVENTOR
By Harold D. Cook
ATTORNEY

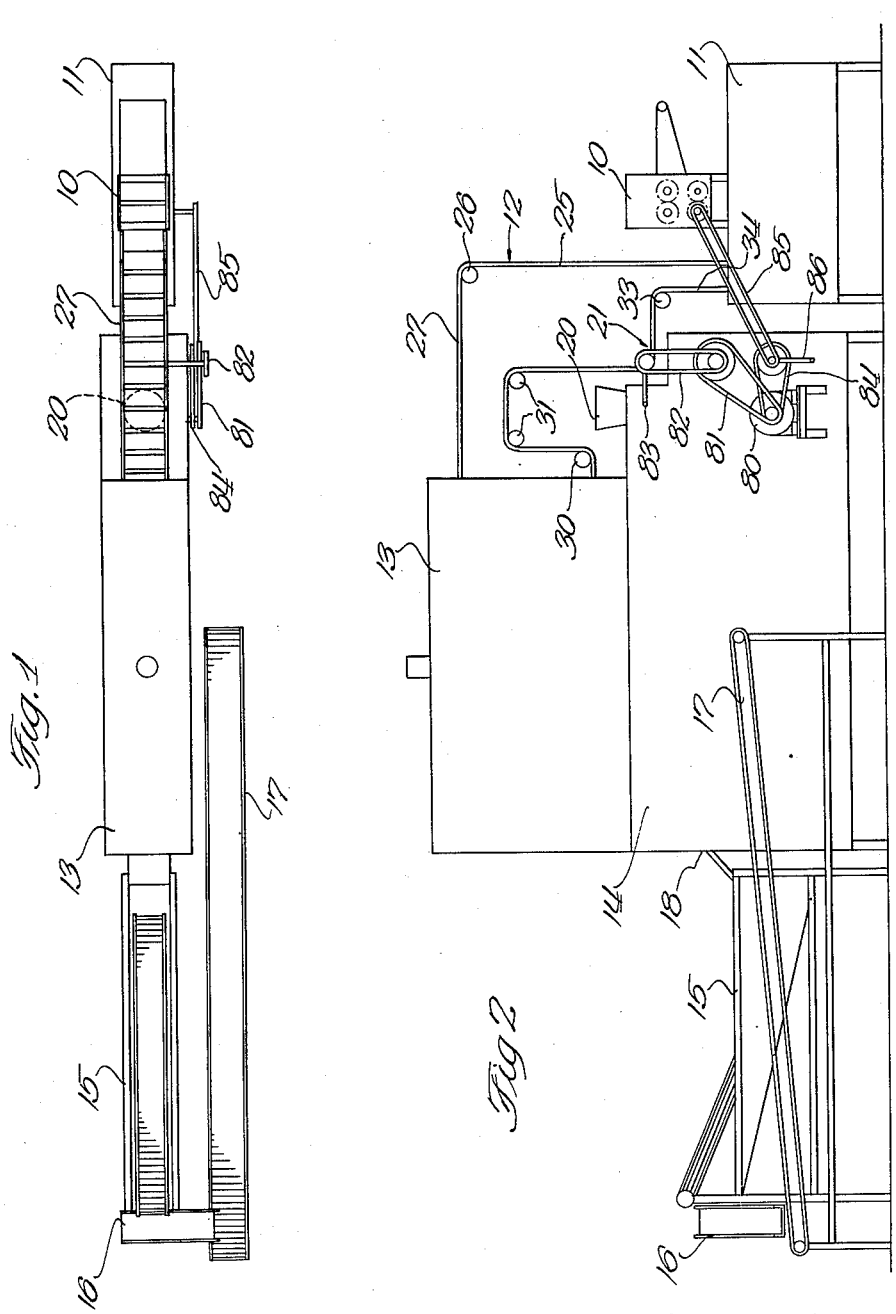

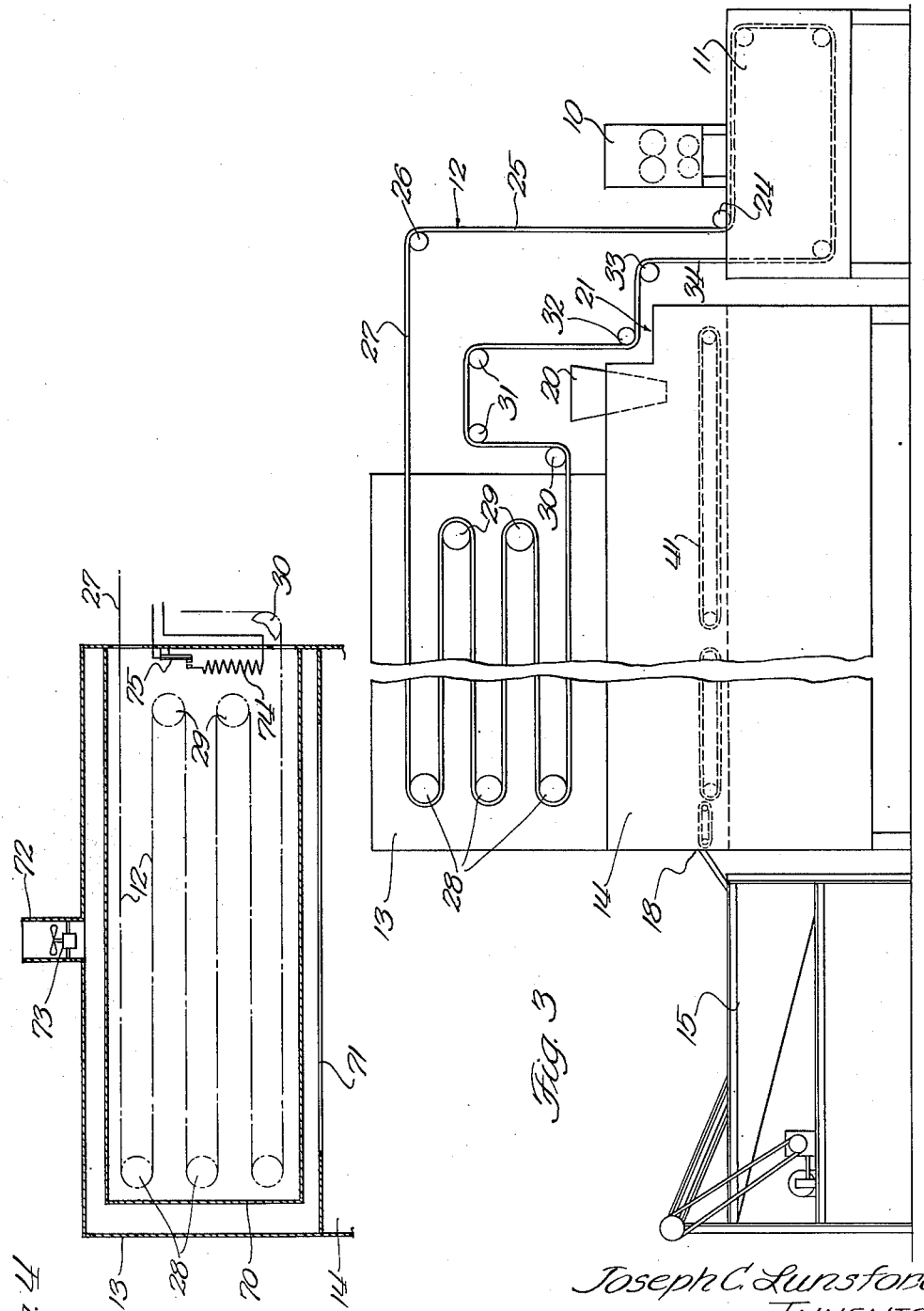

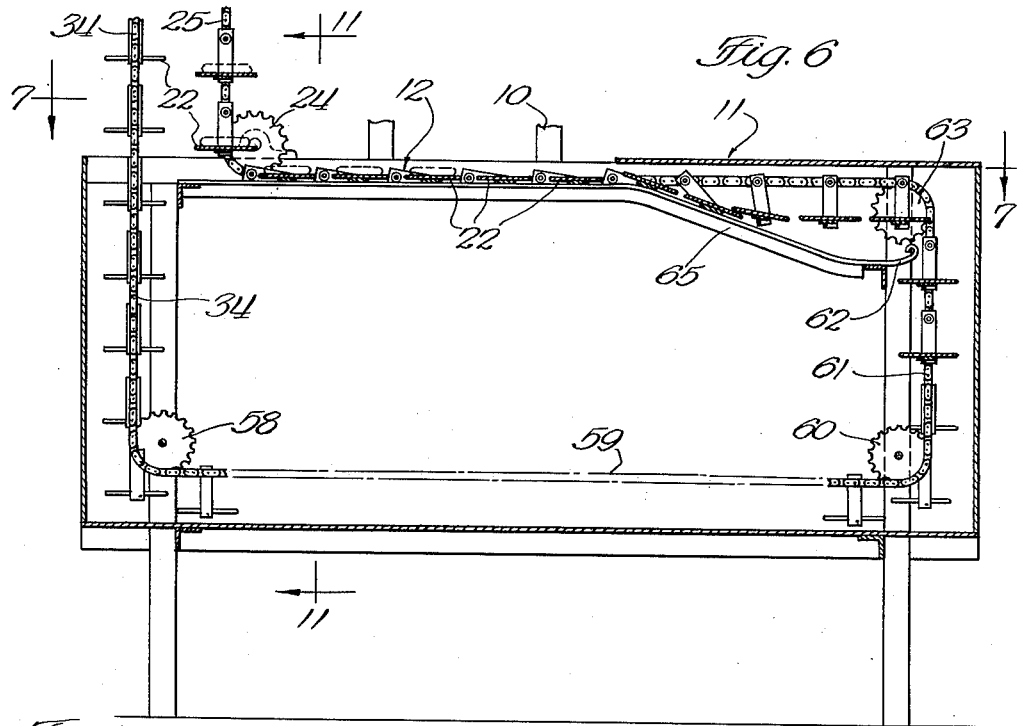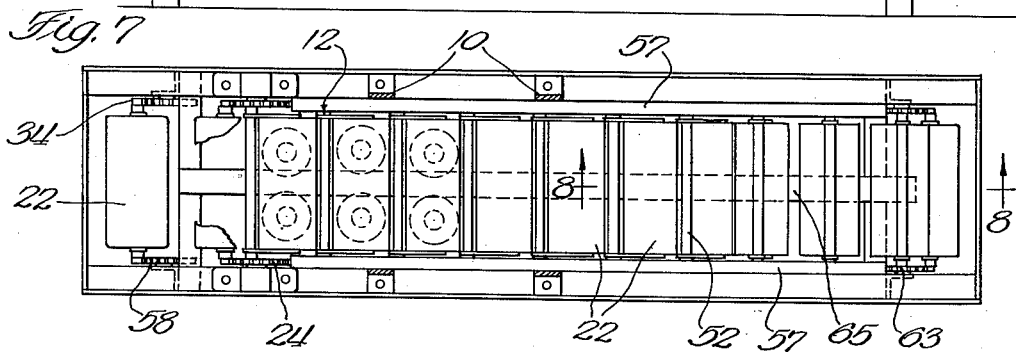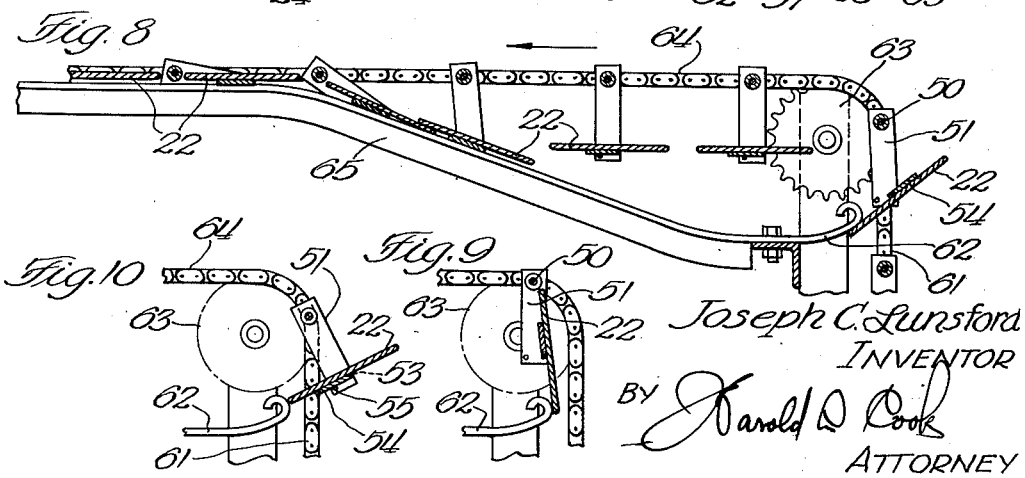

May 6, 1952  J. C. LUNSFORD  2,595,866
DOUGHNUT MACHINE
Filed Feb. 25, 1946  5 Sheets-Sheet 5
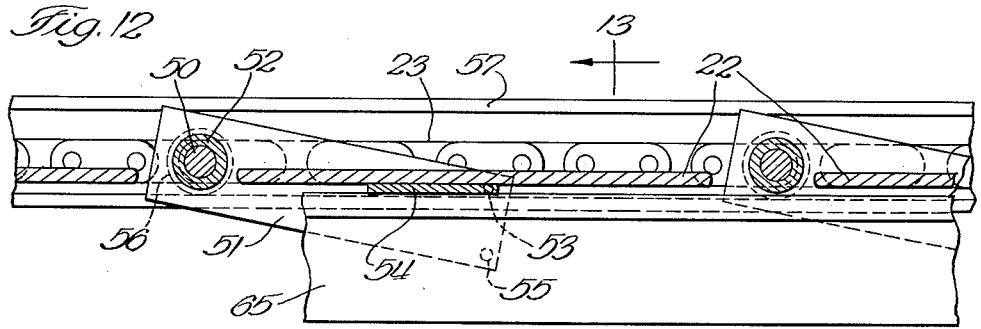
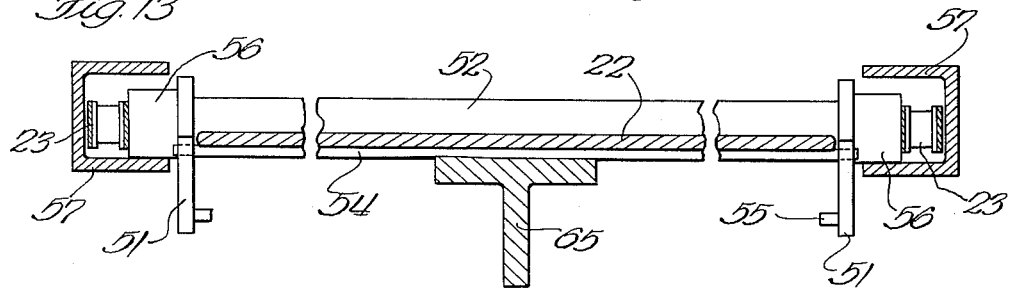
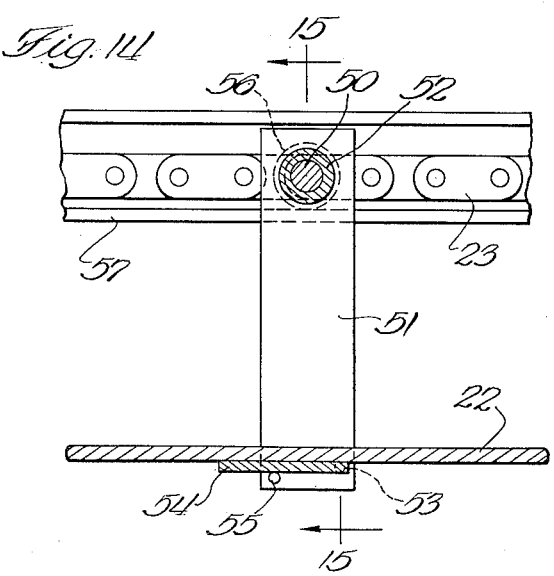
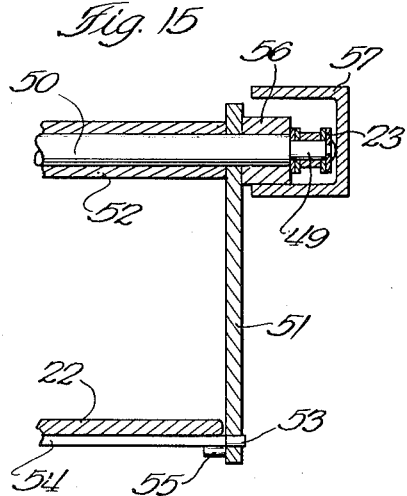
Joseph C. Lunsford
INVENTOR
BY Harold D. Cook
ATTORNEY Patented May 6, 1952

2,595,866

UNITED STATES PATENT OFFICE 2,595,866

DOUGHNUT MACHINE

Joseph C. Lunsford, Portland, Oreg., assignor to H. C. Rhodes, Portland, Oreg.

Application February 25, 1946, Serial No. 649,797

12 Claims. (Cl. 99—405)

This invention relates to apparatus for making doughnuts and similar comestibles and has particular reference to a combination machine adapted to make both cake and raised doughnuts.

Cake doughnuts and raised doughnuts are quite different both in the characteristics of the final product and in the processes by which they are made, and one of the objects of the present invention is to provide a machine which will make doughnuts of high quality of either the cake or raised type. Cake doughnuts are essentially baking powder doughnuts and are relatively easy to make by machine because the dough charges may be dropped directly from the doughnut forming machine into the cooking oil and the particular manner in which the dough is formed into a doughnut ring is not critical to the quality of the doughnut. Raised doughnuts, on the other hand, depend upon yeast action which requires special treatment in the handling of the dough and in the forming of the doughnuts, and which requires time for proofing after the doughnut is formed and before it can be cooked. These requirements are characteristic of true raised doughnuts of the highest quality although so-called raised doughnuts have been made in the past which are in the nature of baking powder doughnuts with a little yeast added. Such doughnuts have been made in a cake doughnut machine because the rising does not depend upon yeast action alone and a certain amount of yeast action does take place while the doughnut is being cooked even if it has not been previously proofed. The term raised doughnuts as used herein, however, applies only to yeast rising doughnuts which require special treatment of the dough prior to the forming of the doughnuts and which require proofing of the doughnuts before cooking, which type of doughnuts cannot be made successfully in a cake doughnut machine.

In making raised doughnuts by hand, the dough is first kneaded and then rolled and sheeted into a suitable thickness for the doughnuts. The doughnuts are cut or formed from the rolled and sheeted dough in such a manner as not to interfere with the initial yeast action, and the formed doughnuts are then allowed to proof at a temperature somewhat above room temperature for a certain time before they are introduced into the cooking machine. In the cooking operation, also, raised doughnuts require different treatment than cake doughnuts in that a longer cooking time is necessary. The present invention takes all these different requirements into consideration in the provision of a single machine for producing both cake and raised doughnuts of high quality. Cake doughnuts produced in the present machine are distinctly cake doughnuts and the raised doughnuts are distinctly raised doughnuts without resorting to compromise mixtures containing both yeast and baking powder, although such compromise doughnuts could also be made in the present machine if desired.

Other objects are to provide improved apparatus for making raised doughnuts of a quality equal to handmade raised doughnuts, to provide a complete machine for sheeting, forming, proofing, cooking, and glazing raised doughnuts, and to include in such a machine means for making cake doughnuts wherein the cooking and other requirements of each type of doughnut are satisfied to produce a high quality product. Further objects are to provide a novel proofing chamber utilizing heat from the cooking machine and to provide a novel conveyor mechanism for automatic loading by a doughnut forming machine to carry the doughnuts into the proofing chamber prior to cooking. Another object is to provide means for discharging cake and raised doughnuts at different stations in the cooking machine to allow extra cooking time for the raised doughnuts.

Other objects and advantages will become apparent from the following description taken in connection with the accompanying drawings, it being understood that the same are by way of illustration and example only, and are not to be taken as limiting the spirit or scope of the invention. The scope of the invention is to be limited only by the terms of the appended claims.

In the drawings:

Figure 1 is a general plan view of the complete apparatus for forming, proofing, cooking, and glazing doughnuts;

Figure 2 is a view in side elevation of the apparatus shown in Figure 1;

Figure 3 is a view similar to Figure 2 but drawn to a larger scale to show the general arrangement of the doughnut conveyor between the forming machine and the proofing chamber and showing the convolutions of the conveyor within the proofing chamber;

Figure 4 is a longitudinal sectional view of the proofing chamber;

Figure 5 is a sectional view on a still larger scale illustrating the apparatus for introducing both cake doughnuts and raised doughnuts into the cooking machine;

Figure 6 is a continuation of the view in Figure 5 showing the raised doughnut loading table in section;

Figure 7 is a plan view of the loading table taken on the line 7—7 of Figure 6;

Figure 8 is a longitudinal sectional view through one end of the loading table taken on the line 8—8 in Figure 7 showing the mechanism for erecting inverted conveyor trays and raising them to loading position;

Figure 9 is a detailed view of certain parts shown in Figure 8 illustrating a further stage in the erection of an inverted conveyor tray;

Figure 10 shows the action of the device of Figure 9 upon a conveyor tray which has not been inverted;

Figure 11 is a vertical sectional view taken on the line 11—11 of Figure 6 showing loaded and unloaded flights of the conveyor;

Figure 12 is an enlarged sectional view of a portion of the loading table shown in Figure 6 where the conveyor trays are raised into loading position;

Figure 13 is a cross sectional view taken on the line 13—13 of Figure 12;

Figure 14 is sectional view of a conveyor tray as it appears when traveling on one of the horizontal reaches of the conveyor after leaving the loading table; and Figure 15 is a cross sectional view taken on the line 15—15 of Figure 14.

As shown in Figures 1 and 2 the present apparatus comprises essentially a plurality of component parts for performing a succession of operations starting with raw dough and finishing with glazed doughnuts ready for packaging. Raised doughnuts are formed in the doughnut forming machine 10 on the loading table 11 where they are deposited at intervals on a conveyor 12. On this conveyor the doughnuts pass slowly through the proofing chamber 13 in a tortuous path of sufficient length to allow time for proofing before being introduced into the cooking machine 14. In the cooking process the doughnuts are advanced through the length of the cooking machine until they are finally discharged into a glazing machine 15. The glazing machine is equipped to completely coat or glaze the doughnuts with a suitable liquid icing, then drain excess glazing material and discharge the finished doughnuts on a slide 16 which is arranged to deposit them at intervals upon a portable conveyor section 17. The glazing machine 15 is also portable so that it may be moved away from the cooking machine 14 when unglazed doughnuts are to be made. In such case, the conveyor 17 is shifted to receive the output from the cooking machine from its discharge end 18 and transport the hot doughnuts to a convenient position for cooling and packaging or loading in the usual bakery trays. The portability of the glazing machine 15 and conveyor 17 enables these units to be positioned most conveniently to fit the space where the apparatus is used, it being understood that these units are made to function satisfactorily at different angles with respect to each other and with respect to the cooking machine 14. The numeral 20 designates a cake doughnut forming machine which is arranged to discharge directly into the cooking machine 14 to make cake doughnuts.

The raised doughnut forming machine 10 may take any form capable of producing high quality raised doughnuts, one type of such machine which is particularly suited for the present purpose being illustrated in my copending application, Serial No. 648,712, entitled Doughnut Forming Machine, filed February 19, 1946. This doughnut forming machine is particularly designed to handle yeast rising dough for making raised doughnuts but the details of construction are not included in the present invention.

The details of the glazing machine 15 likewise are not included in the present invention but a preferred embodiment of such a machine is disclosed and claimed in my copending application, Serial No. 648,713, entitled Doughnut Glazing Machine, filed February 19, 1946. This application has now matured into Letters Patent No. 2,525,306, issued October 10, 1950.

It will be observed in Figures 2 and 3 that the proofing chamber 13 is positioned directly above the cooking machine 14 to receive heat therefrom. Thus, the proofing chamber may be heated entirely by hot air rising from the cooking machine to maintain the desired proofing temperature. Alternatively, the proofing chamber may receive only a part of its heat from the cooking machine and may be additionally heated by a thermostatically controlled heater within the proofing chamber to maintain a predetermined even temperature in which case the additional heater would need be of relatively small capacity just sufficient to provide a controlling influence to compensate for changes in the ambient temperature in the room in which the apparatus is situated.

A preferred heating arrangement for the proofing chamber is shown in Figure 4. This chamber is of double walled construction having an inner wall 70 spaced within the outer wall which is designated generally by the numeral 13. One or more openings 71 in the top of the cooking machine 14 admit hot air to rise and circulate around the wall 70 to warm the proofing chamber, such air being allowed to escape through the top vent 72 to promote a natural convection circulation. This circulation may be increased by an exhaust fan 73 if desired. The inner wall 70 prevents grease and smoke from the cooking machine from coming into contact with the raw dough charges on the conveyor 12 during the proofing process.

Although there may be sufficient heat received from the cooking machine to adequately warm the proofing chamber, it is preferred to limit this heat exchange by suitable restriction of the openings 71 and 72 so that some additional heat from an independent source will be required, to provide a convenient means of temperature control in the proofing chamber. To this end an auxiliary heater 74 controlled by a thermostat 75 is arranged in the proofing chamber to operate from time to time as may be required to maintain a constant temperature. The amount of heat thus supplied by the heater 74 is relatively small but provides an effective control to prevent variation of the proofing temperature in summer and winter operation and under other conditions of ambient temperature variation.

The construction of the conveyor 12 will be described in detail as the specification proceeds with reference to the various detail views on the drawings, but reference is first made to Figures 2 and 3 to show the entire path of travel of this conveyor from its loading station on the loading table 11 through the proofing chamber 13 to its tripping or unloading station 21 in the cooking machine 14. In general, this conveyor comprises a plurality of trays 22 suspended between a pair of chains 23 which are adapted to ride in supporting channels in certain horizontal flights of the conveyor and to pass over pairs of sprocket wheels to change direction between horizontal and vertical flights. Thus, from the loading table 11, the conveyor passes around a pair of sprocket wheels 24 to direct it upwardly in a vertical flight 25 to another pair of sprocket wheels 26 on a level with the upper part of the proofing chamber 13. From the sprockets 26, the conveyor enters the proofing chamber and proceeds to the remote end thereof in a top horizontal flight 27 after which it passes back and forth between pairs of sprockets 28 and 29 in opposite ends of the proofing chamber in successive horizontal flights, one below the other. The last horizontal flight within the proofing chamber takes the conveyor out and around a pair of sprockets 30 where it is directed upwardly over a pair of sprockets 31 to clear the cake doughnut forming machine 20. From the high sprockets 31 the conveyor descends to low sprockets 32 in the cooking machine at a suitable level for dropping the doughnuts into the cooking oil at the unloading station 21. Upon leaving the unloading station the conveyor passes over sprockets 33 where it descends in a vertical flight 34 adjacent the upward vertical flight 25 to return beneath the loading table.

As shown in Figure 5, the proofed doughnuts are discharged at the unloading station 21 by the action of a tripper 40 synchronized with the motion of a conveyor 41 in the cooking machine so that the trays 22 are tilted to drop the doughnuts at the proper time to fall between spaced bars 42 on the conveyor 41. The conveyor 41 is submerged in cooking oil 43 in which the doughnuts float as they are pushed along by the bars 42 from one end of the cooking machine to the other in the direction indicated by the arrow 44, it being understood, of course, that suitable mechanism is provided for turning the doughnuts at an intermediate station. The speed of the conveyor 41 is adjusted to produce the desired cooking interval by the time the doughnuts have progressed the length of the cooking chamber and the speed of the conveyor 12 is coordinated therewith to bring a tray 22 into tripping position for each space between the bars 42. The exact timing of the tripping operation is accomplished by the tripper 40 so that the doughnuts drop accurately between the bars 42.

The manner in which the doughnut trays 22 are pivotally hung between the conveyor chains 23 for travel in the vertical and horizontal flights and to produce the desired action in the loading and tripping operations is best shown in Figures 14 and 15. The pivotal connections between certain of the chain links comprise reduced ends 49 on rods 50 which thereby interconnect the two chains 23 at spaced intervals. A pair of arms 51 hang on each rod 50 at the ends of a spacing sleeve 52 and provide bearings for trunnions 53 on the trays 22. In the present construction, the trunnions 53 are formed on the ends of a plate 54 which is made as an integral part of the tray 22 and serves as a counterweight therefor to cause the tray to be supported in a horizontal position by abutment pins 55 carried by the arms 51 in spaced relation with the trunnions 53. The bearings for the trunnions 53 are preferably located on one side of the arms 51 with the pins 55 located on the other side of the arms to obtain a spacing between these parts almost equal to the width of the arms. The trunnions 53 are located considerably off center with respect to the center of gravity of tray 22 and counterweight 54 whereby the trays and arms form a stirrup arrangement which is in stable equilibrium with the tray horizontal as shown in Figure 14, but which permits the tray to pivot in one direction to discharge its doughnut load as shown in Figure 5.

The outer ends of the rods 50 between the hanger arms 51 and the chains 23 carry rollers 56 for supporting horizontal flights of the conveyor in guide track channels 57 as shown in Figures 13 and 15. The proofing chamber is equipped with such guide tracks to support the long horizontal flights where the conveyor is fully loaded, and particular reference will be made to the guide tracks in the loading table.

Figures 6 to 10 illustrate the action of the conveyor in and on the loading table. The action of the tripper 40 may in some cases fail to overbalance the trays 22 allowing them to return to their original position, but in other cases the trays may become inverted whereupon they will remain inverted during their travel down the vertical flight 34, around the lower sprocket 58 and throughout the lower horizontal flight 59 under the loading table. After passing around the sprockets 60, the trays rise in a vertical flight 61 where they encounter an erecting arm 62 just as the conveyor chains are about to pass around a pair of sprockets 63 immediately under the surface of the loading table 11. When the trays come up the flight 61 in inverted position, they are partially erected by the arm 62 during the upward travel of the rod 50 upon which they hang, as shown in Figure 8, and then as the rod 50 passes over the top of the sprockets and commences travel in the horizontal flight 64 the tray 22 is tilted over center as shown in Figure 9 whereupon it immediately falls into erected position with its top side uppermost. Trays which are already right side up as they rise in the vertical flight 61 merely swing out as they pass the erecting arm 62 in the manner shown in Figure 10 whereby all the trays enter upon the horizontal flight 64 in erected position ready for loading.

Before emerging from beneath the table top 11 the trays 22 engage an inclined central rail 65 to swing them back and raise them up into the plane of the chains 23 and guide tracks 57. The guide tracks in the loading table are omitted in Figures 6 and 8 for clearness, but may be seen in Figures 12 and 14. This brings the trays in substantially edge to edge relation as shown in Figures 6, 7, 8, and 12 approximately on the level of the loading table 11 where the doughnuts may be conveniently placed by hand or dropped from the doughnut forming machine 10 without interference by the chains 23 and rods 50. The machine 10 is geared to the conveyor 12 to drop the formed dough charges accurately upon the trays as they pass therebeneath.

The trays 22 loaded with their dough charges then slide on the central rail 65 until they are lifted therefrom by the hanger arms 51 after the rods 50 have passed around the sprockets 24 and have started to ascend on the vertical flight 25. After leaving the rail 65 the trays are supported in horizontal position by the pins 55 throughout the various vertical and horizontal flights up to and within the proofing chamber, until they are tripped at the unloading station 21 in the cooking machine. In the present apparatus the doughnuts travel in pairs on the trays 22 as shown in Figure 7, and in the cooking machine, and the forming machine 10 is designed likewise to form them in pairs.

Thus, the present invention provides a combination apparatus for the completely automatic manufacture of both raised and cake doughnuts. When cake doughnuts are to be made, the cake doughnut dough is placed in the hopper of the forming machine 20, and the machine 10 and conveyor 12 may be stopped. The shorter distance of travel of the cake doughnuts from the forming machine 20 to the discharge end of the cooking machine provides the necessary differential in cooking time as compared with the cooking time for raised doughnuts so that the cooking oil may always be maintained at the same temperature for both types of doughnuts. Neither forming machine interferes with the other, and both may remain as a permanent installation available for immediate use when needed.

Various expedients may be utilized for co-ordinating and synchronizing the operation of the various mechanisms employed for forming, conveying, tripping, cooking, and glazing. This may be conveniently accomplished by driving the cooking machine, proofing conveyor, and forming machines from a single motor 80 as shown in Figure 2. From a reduction gear drive incorporated in motor 80 a chain 81 drives the cooking machine conveyor 41 and a second chain 82 drives the proofing conveyor 12. The proofing conveyor may be disconnected by a clutch 83 to stop its operation at any time. The motor 80 also drives a pair of chains 84 and 85 having a clutch 86 interposed therebetween, the chain 85 being operative to drive the forming machine 10 when the clutch is engaged. Thus, the forming machine 10 and proofing conveyor 12 may both be stopped while the forming machine 20 is in operation, or either one of these mechanisms may be stopped independently in case of trouble. When both clutches 83 and 86 are engaged, the cooking machine, proofing conveyor, and forming machine 10 are all geared together for making raised doughnuts.

The glazing machine 15 is preferably provided with its own driving mechanism so as to be independent of the other apparatus. The conveyor 17 may be driven by any suitable means and is preferably also an independent self-contained unit to satisfy the interests of portability.

Having now described my invention and in what manner the same may be used, what I claim as new and desire to protect by Letters Patent is:

1. In a doughnut machine, a loading table, a doughnut forming machine on said table, a conveyor for handling dough charges from said machine, means for supporting said conveyor in horizontal and vertical flights for the movement of said dough charges, pivotally mounted trays on said conveyor for carrying said dough charges, means for tripping said trays to introduce said dough charges into a cooking chamber, and an inclined rail disposed in the path of said trays in a horizontal flight of the conveyor approaching said loading table for bringing all parts of said conveyor into a common horizontal plane on said loading table with said trays in side by side relation in loading position at said forming machine.

2. In a doughnut machine, a loading table, a doughnut forming machine on said loading table, a conveyor for handling dough charges from said forming machine, said conveyor comprising a pair of chains, pairs of hanger arms pivotally mounted at intervals on said chains, trays pivotally mounted on said hanger arms, means for guiding said chains in a horizontal flight across the top of said loading table, and an inclined rail disposed beneath the horizontal flight of said chains approaching the loading table for leveling said trays into the plane of said chains for receiving said dough charges from said forming machine.

3. In a doughnut machine and the like, a loading station, a pair of chains guided for horizontal travel at said loading station, trays mounted at intervals between said chains, and an inclined rail disposed in the path of said trays in said horizontal travel approaching said loading station for leveling said trays into the plane of said chains during a portion of their travel at said loading station.

4. In a doughnut machine and the like, a loading table for dough charges, a pair of conveyor chains having a horizontal path of travel across the top of said table, pivotally mounted trays suspended at intervals between said chains, means for erecting inverted trays before their passage across said table, and an inclined rail disposed in the path of said trays in said horizontal path of travel approaching said loading table for leveling said trays into the plane of said chains for loading.

5. In a cooking machine and the like, a pair of conveyor chains arranged in horizontal and vertical flights, a plurality of trays carried by said conveyor chains having eccentric pivotal mountings to maintain them in horizontal positions throughout portions of said horizontal and vertical flights, means to trip said trays to remove charges therefrom, means to erect trays which have been inverted by said tripping means, and an inclined rail disposed in the path of said trays beneath said chains in one of the horizontal flights of said conveyor to raise said trays into the plane of said chains to facilitate the loading of charges thereon.

6. In a cooking machine and the like, a pair of conveyor chains, pairs of hanger arms pivotally mounted on said chains at spaced intervals, trays pivotally mounted between said hanger arms, and a rail arranged to lift said trays up to the level of said chains in a horizontal flight of the chains.

7. In a doughnut machine and the like, a conveyor communicating with a loading table, proofing chamber and cooking chamber, said conveyor comprising a pair of parallel chains, pairs of hanger arms pivotally mounted at intervals on said chains, article trays pivotally mounted on said hanger arms to be suspended beneath the pivotal mounting of said arms, means for leveling said trays into the plane of said chains in a horizontal flight of said chains on said loading table, means for tripping said trays to introduce the contents thereof at a station in said cooking chamber, and means in said loading table for erecting trays which remain inverted after said tripping operation.

8. A machine for making raised doughnuts and and the like comprising a cooking chamber, a doubled walled proofing chamber mounted above said cooking chamber, said proofing chamber having an inner wall to enclose the chamber and exclude cooking vapors from the cooking chamber and an outer wall having an opening in communication with said cooking chamber to convey heat from said cooking chamber between the walls of the proofing chamber, and means for conveying doughnuts from said proofing chamber into said cooking chamber.

9. In a doughnut machine, a cooking chamber, a double walled proofing chamber mounted above said cooking chamber, said proofing chamber having an inner wall to enclose the chamber and exclude cooking vapors from the cooking chamber and an outer wall having an opening in communication with said cooking chamber to convey heat from the cooking chamber between the walls of the proofing chamber, a heating element in said proofing chamber to supplement heat received from said cooking chamber, a thermostatic control for said heating element in said proofing chamber to control said supplemental heat and maintain a substantially constant temperature in the proofing chamber, and means for conveying doughnuts from said proofing chamber into said cooking chamber.

10. In a cooking machine, a pair of laterally spaced traveling chains, hanger arms pivotally mounted on said chains, flat article trays pivotally mounted at opposite ends between said hanger arms on the two chains, and means on said arms to support said trays in horizontal position when the hanger arms are hanging vertically from the chains.

11. In a cooking machine, a conveyor comprising a pair of laterally spaced chains, horizontal rods interconnecting said chains at intervals, a pair of spaced pendant hanger arms pivotally mounted on each rod for free pivotal movement thereon, flat article trays pivotally mounted between said pairs of hanger arms, one tray under each rod, means on said hanger arms to support said trays in horizontal position when the hanger arms are hanging vertically from the chains, track rollers on said rods, and horizontal guide tracks for said rollers extending along said chains.

12. In a combination machine for making both raised and cake doughnuts, an elongated cooking chamber having input and discharge ends, means to move doughnuts longitudinally through said chamber to time the cooking interval by the time of travel through said chamber, means for introducing cake doughnuts into said cooking chamber at an intermediate station near its input end, a double walled proofing chamber mounted on top of said cooking chamber between said cake doughnut introducing means and said discharge end, said proofing chamber having an inner wall to enclose the chamber and exclude cooking vapors from the cooking chamber and an outer wall having an opening in communication with said cooking chamber to convey heat from said cooking chamber between the walls of the proofing chamber, a conveyor in said proofing chamber for raised doughnuts, said conveyor extending out of said proofing chamber and around said cake doughnut introducing means to said input end of said cooking chamber, and means at said input end to transfer proofed doughnuts from said conveyor to said cooking chamber.

JOSEPH C. LUNSFORD.

REFERENCES CITED

The following references are of record in the file of this patent:

UNITED STATES PATENTS

| Number | Name | Date |
| --- | --- | --- |
| 660,451 | McCaslin | Oct. 23, 1900 |
| 975,181 | Turnbull | Nov. 8, 1910 |
| 1,369,266 | Purdy | Feb. 22, 1921 |
| 1,391,212 | Schaller | Sept. 20, 1921 |
| 1,440,663 | Dunn | Jan. 2, 1923 |
| 1,630,676 | Smith | May 31, 1927 |
| 1,821,689 | Broeg | Sept. 1, 1931 |
| 2,055,639 | Scheibel | Sept. 29, 1936 |
| 2,144,182 | Ellis | Jan. 17, 1939 |
| 2,219,410 | Bradshaw | Oct. 29, 1940 |